United States Patent
Onodera et al.

(10) Patent No.: US 9,596,011 B2
(45) Date of Patent: Mar. 14, 2017

(54) BASE STATION APPARATUS, TERMINAL APPARATUS, AND WIRELESS COMMUNICATION SYSTEM

(71) Applicant: Sharp Kabushiki Kaisha, Osaka-shi, Osaka (JP)

(72) Inventors: Takashi Onodera, Osaka (JP); Hiromichi Tomeba, Osaka (JP); Minoru Kubota, Osaka (JP); Alvaro Ruiz Delgado, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 109 days.

(21) Appl. No.: 14/401,144

(22) PCT Filed: May 15, 2013

(86) PCT No.: PCT/JP2013/063507
§ 371 (c)(1),
(2) Date: Nov. 14, 2014

(87) PCT Pub. No.: WO2013/172368
PCT Pub. Date: Nov. 21, 2013

(65) Prior Publication Data
US 2015/0103742 A1    Apr. 16, 2015

(30) Foreign Application Priority Data

May 18, 2012 (JP) ................................ 2012-114900

(51) Int. Cl.
*H04W 4/00* (2009.01)
*H04B 7/04* (2006.01)
(Continued)

(52) U.S. Cl.
CPC ......... *H04B 7/0456* (2013.01); *H04B 7/0452* (2013.01); *H04B 7/0689* (2013.01); *H04W 16/08* (2013.01); *H04W 16/32* (2013.01)

(58) Field of Classification Search
None
See application file for complete search history.

(56) References Cited

U.S. PATENT DOCUMENTS

| | | | |
|---|---|---|---|
| 2008/0181285 A1* | 7/2008 | Hwang | H04B 7/0452 375/148 |
| 2010/0074207 A1* | 3/2010 | Pan | H04B 7/0452 370/329 |
| 2011/0081935 A1* | 4/2011 | Yeon | H04W 52/146 455/522 |

OTHER PUBLICATIONS

Official Communication issued in International Patent Application No. PCT/JP2013/063507, mailed on Jul. 23, 2013.
(Continued)

*Primary Examiner* — Zewdu A Beyen
(74) *Attorney, Agent, or Firm* — Keating & Bennett, LLP

(57) ABSTRACT

The present invention provides a technology that sets an offset value with respect to a received power of a reference signal from each of base station apparatuses, taking into consideration a difference between precoding schemes, in a wireless communication system that supports multiple different precoding schemes. The base station apparatus according to the present invention communicates with at least one of terminal apparatuses using the multiple different precoding schemes. The base station apparatus according to the present invention includes a transmission unit that transmits to the terminal apparatus multiple offset values that are to be added by the terminal apparatus to the received power of the reference signal from the base station apparatus, in which the multiple offset values correspond to the multiple precoding schemes, respectively.

13 Claims, 10 Drawing Sheets

(51) Int. Cl.
  *H04W 16/08* (2009.01)
  *H04B 7/06* (2006.01)
  *H04W 16/32* (2009.01)

(56) References Cited

OTHER PUBLICATIONS

Khandekar et al., "LTE-Advanced: Hetergeneous Networks," 2010 European Wireless Conference, 2010, pp. 978-982.
3GPP TS 36.331, V10.4.0, "3rd Generation Partnership Project; Technical Specification Group Radio Access Network; Evolved Universal Terrestrial Radio Access (E-UTRA); Radio Resource Control (RRC); Protocol Specification, (Release 10)," Dec. 2011, pp. 1-296.
Spencer et al., "An Introduction to the Multi-User MIMO Downlink," IEEE Communication Magazine, Oct. 2004, pp. 60-67.
Hochwald et al., "A Vector-Perturbation Technique for Near-Capacity Multiantenna Multiuser Communication—Part II: Perturbation," IEEE Transactions on Communications, vol. 53, No. 3, Mar. 2005, pp. 537-544.
Kikuchi et al., "Proposal of Adaptive Control CRE in Hetergeneous Networks," 2012 IEEE 23rd International Symposium on Personal, Indoor and Mobile Radio Communication—(PIMRC), pp. 910-914.

* cited by examiner

FIG. 6

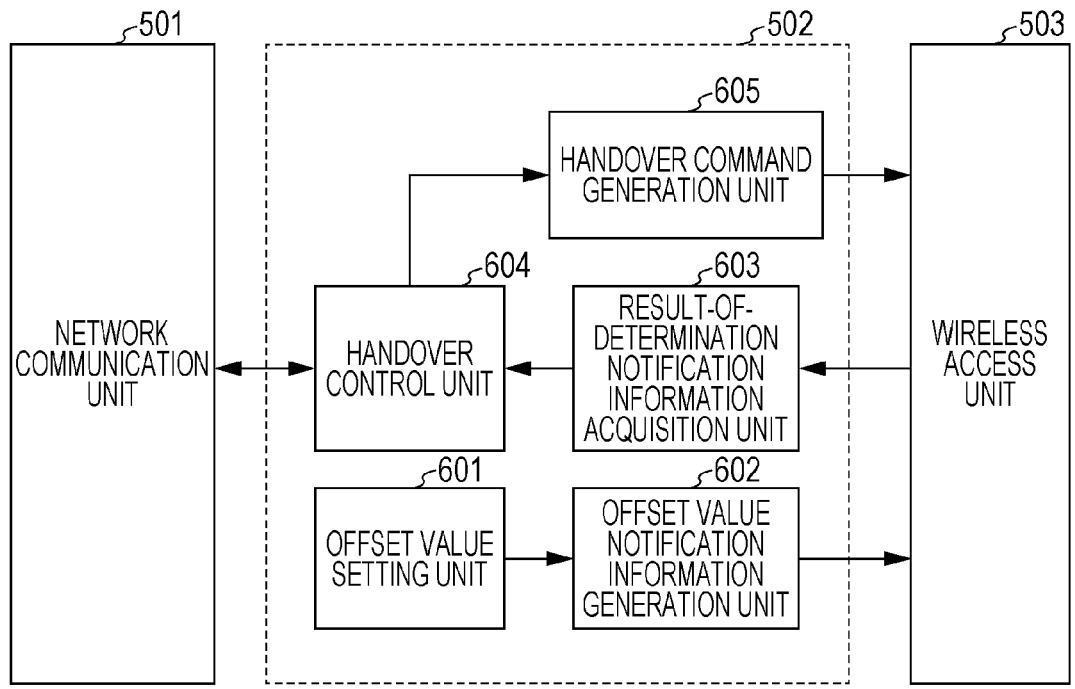

FIG. 7

|  | FIRST OFFSET VALUE | SECOND OFFSET VALUE |
|---|---|---|
| MACRO BASE STATION APPARATUS SUPPORTING ONLY LINEAR MU-MIMO | 0 | NOT SET (NOT NOTIFIED) |
| MACRO BASE STATION APPARATUS SUPPORTING BOTH OF LINEAR MU-MIMO AND NONLINEAR MU-MIMO | 0 | 0 |
| PICO BASE STATION APPARATUS SUPPORTING ONLY LINEAR MU-MIMO | $\alpha_1$ | NOT SET (NOT NOTIFIED) |
| PICO BASE STATION APPARATUS SUPPORTING BOTH OF LINEAR MU-MIMO AND NONLINEAR MU-MIMO | $\alpha_1$ | $\alpha_2$ ($\alpha_2 = \alpha_1 + \beta$ ; $\beta > 0$) |

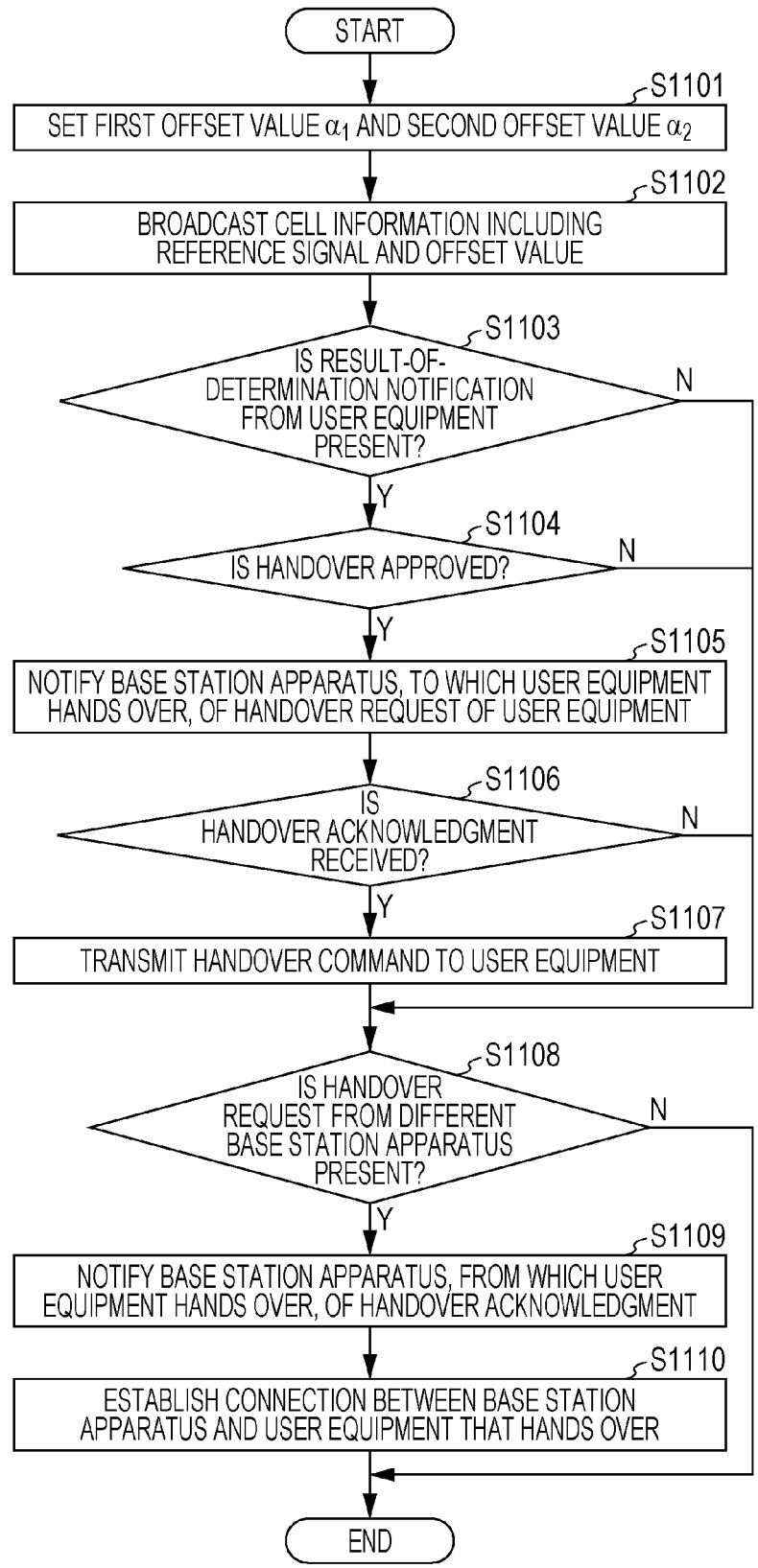

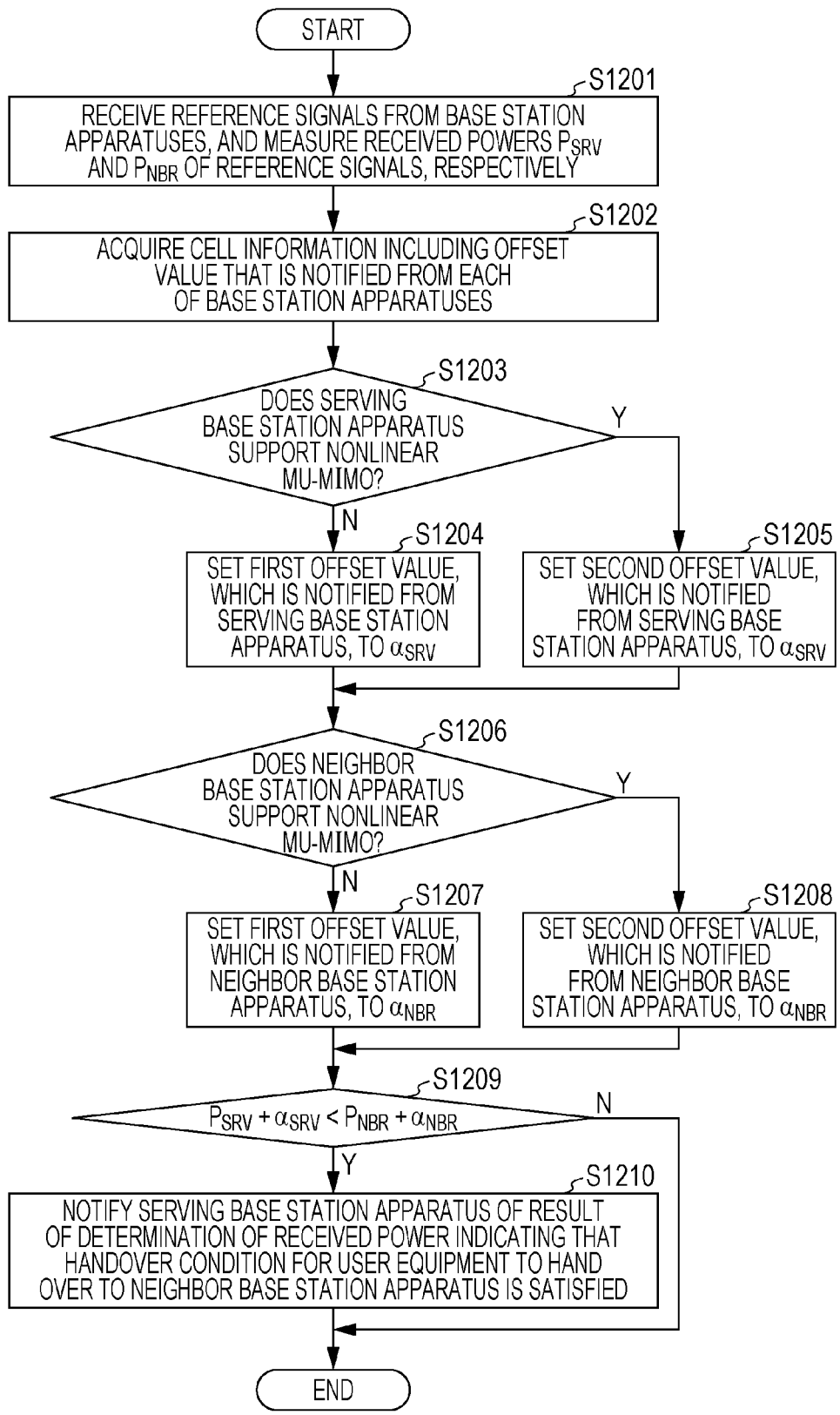

BASE STATION APPARATUS, TERMINAL APPARATUS, AND WIRELESS COMMUNICATION SYSTEM

TECHNICAL FIELD

The present invention relates to a technology for selecting a cell that multiple base station apparatuses make up and to which each terminal apparatus has to connect in a wireless communication system.

BACKGROUND ART

In recent years, in a cellular system for portable telephones and the like, a rapid increase in an amount of data traffic accompanying the wide use of smartphones has brought about a problem of a shortage of communication bandwidth in the cellular system.

To cope with such a situation, for example, it is considered in Long-Term Evolution-Advanced (LTE-Advanced), that is, the next mobile communication type, and later standards in the Third Generation Partnership Project (3GPP) that a small-scale base station apparatus (a pico base station apparatus that makes up a pico cell or a femto base station apparatus that makes up a femto cell) that has a smaller transmitted power and service area than a macro base station apparatus be additionally arranged within a service area of a large-scale base station apparatus (macro base station apparatus) that makes up a macro cell in the related art, for a local area where a large amount of traffic occurs in a concentrated manner. It is proposed that an increase in a capacity of communication of the system due to a traffic off-load effect be accomplished by such a heterogeneous network (HetNet) in which the small-scale base station apparatus is arranged within the service area of the macro base station apparatus (NPL 1).

In a general cellular system that is configured from the macro base station apparatus, in a case where the user equipment (the terminal apparatus) selects the base station apparatus as a connection destination, a received power of a reference signal (the received power of the reference signal is also referred to as a reference signal received power (RSRP)) that is transmitted by each base station apparatus serves as a reference and thus the base station apparatus that has a highest received power of the reference signal is selected as the connection destination.

However, for example, in the heterogeneous network in which the pico base station apparatus is additionally arranged within the macro cell, in a case where the base station apparatus that has a highest received power of the reference signal is selected as the connection destination, a difference in a transmitted power between the macro base station apparatus and the pico base station apparatus makes a cell radius of the pico base station apparatus considerably smaller than the macro base station apparatus and restricts an effect of increasing the amount of communication of the system due to the introduction of the pico base station apparatus.

Then, cell range expansion (CRE) is considered in which addition of an offset value to the received power of the reference signal from the pico base station apparatus increases a probability of the terminal apparatus selecting the pico base station apparatus as the connection destination and increases a cell radius of a coverage area (pico cell) of the pico base station apparatus (NPL 1).

For example, in LTE-Advanced, the offset value (CRE offset value) is notified to the terminal apparatus by high-layer signaling (NPL 2).

On the other hand, as a technology for greatly improving spectral efficiency, a multiple input multiple output (MIMO) technology that performs wireless transmission using multiple transmit and receive antennas is attracting attention, and is practically used in the cellular system, a wireless LAN system, or the like.

An amount of improvement in the spectral efficiency due to the MIMO technology is proportional to the number of the transmit and receive antenna. However, the number of the receive antennas that can be arranged in the terminal apparatus is limited. Thus, multi-user MIMO (MU-MIMO) in which multiple items of terminal apparatus that make connections at the same time are regarded as a virtual large-scale antenna array, and a transmit signal from the base station apparatus to each item of terminal apparatus is space-multiplexed is effective in improving the spectral efficiency.

In the MU-MIMO, because the transmit signals that are destined for the terminal apparatus, respectively, are received in the terminal apparatus, as inter-user-interference (hereinafter referred to as IUI), it is necessary to suppress the IUI. For example, in LTE or LTE-Advanced, linear precoding is employed in which the base station apparatus multiplies in advance a linear filter, which is calculated based on channel state information that is notified by each terminal apparatus, by the transmit signal, and thus the IUI is suppressed.

However, as long as channel orthogonality of each terminal apparatus, which is space-multiplexed, is not high, because the IUI cannot be effectively suppressed, there is a limit in the improvement in the spectral efficiency in the MU-MIMO that is based on the linear precoding.

Thus, in recent years, an MU-MIMO technique, which uses nonlinear precoding in which nonlinear processing is performed at the base station apparatus, has attracted attention. In the terminal apparatus, in a case where a modulo (surplus) operation is possible, it is possible to add to the transmit signal a perturbation vector of which a component is a complex number (perturbation member) that results from multiplying a constant real number by an arbitrary Gaussian integer. Then, according to a channel state between the base station apparatus and the multiple terminal apparatuses, the perturbation vector is suitably set and thus the transmit signal is generated. As a result, even though the channel orthogonality of each of the terminal apparatuses, which is space-multiplexed, is not high, it is possible to reduce necessary transmission power more greatly than in the linear precoding in which the perturbation vector is not added, and the transmission efficiency can be greatly improved (NPL 3 and NPL 4).

CITATION LIST

Non Patent Literature

NPL 1: A. Khandekar et al., "LTE-Advanced: Heterogeneous Networks", Proc. European Wireless 2010, pp. 978-982, April 2010

NPL 2: 3GPP, "E-UTRA; Radio Resource Control (RRC); Protocol specification (Release 10)", TS 36.331 V10.4.0, December 2011

NPL 3: Spencer et al., "An Introduction to the Multi-User MIMO Downlink", IEEE Communication Magazine, Vol. 42, Issue 10, pp. 60-67, October 2004

NPL 4: B. M. Hochwald et al., "A vector-perturbation technique for near-capacity multiantennamultiusercommunication-Part II: Perturbation", IEEE Trans. Commun., Vol. 53, No. 3, pp. 537-544, March 2005

SUMMARY OF INVENTION

Technical Problem

In the current CRE, cell selection suitable for transmission performance of each of the base station apparatuses is performed without considering an effect of improving the received signal power in the terminal apparatus due to a difference between types of transmission processing in each base station apparatus, and particularly, an effect of improving the received signal power due to a difference between types of multi-user MIMO (MU-MIMO), for example, a difference between the MU-MIMO scheme due to the linear precoding and the MU-MIMO scheme due to the nonlinear precoding.

The present invention provides a technology that sets an offset value with respect to a received power of a reference signal from each base station apparatus, taking into consideration a difference between precoding schemes, in a wireless communication system that supports multiple different precoding schemes.

Solution to Problem

According to an aspect of the present invention, there is provided a base station apparatus that communicates with at least one of terminal apparatuses using multiple different precoding schemes, the base station apparatus including a transmission unit that transmits to the terminal apparatus multiple offset values that are to be added by the terminal apparatus to a received power of a reference signal from the base station apparatus, in which the multiple offset values correspond to the multiple precoding schemes, respectively. With this configuration, it is possible that the base station apparatus properly sets the offset value of the received power of the reference signal according to the precoding scheme that is supported.

Furthermore, in the base station apparatus according to the present invention, the multiple precoding schemes may be a linear precoding scheme and a nonlinear precoding scheme, and the multiple offset values may include a first offset value that corresponds to a linear MU-MIMO which uses the linear precoding scheme, and a second offset value that corresponds to a nonlinear MU-MIMO which uses the nonlinear precoding scheme. With this configuration, it is possible that the base station apparatus properly sets the offset value of the received power of the reference signal according to the MU-MIMO scheme that is supported.

Furthermore, in the base station apparatus according to the present invention, the second offset value may be greater than the first offset value. With this configuration, it is possible that the terminal apparatus that performs the communication using the precoding scheme corresponding to the second offset value connects preferentially to the base station apparatus.

Furthermore, in the base station apparatus according to the present invention, the transmission unit may transmit the first offset value and a value of a difference between the first offset value and the second offset value. With this configuration, it is possible that the second offset value is notified to the terminal apparatus using only the first offset value and the value of the difference.

Furthermore, in the base station apparatus according to the present invention, the second offset value may be a value that results from adding to the first offset value a value of a difference between a received gain in a case where the nonlinear MU-MIMO is used and a received gain in a case where the linear MU-MIMO is used. With this configuration, it is possible that the base station apparatus sets the offset value based on the received gain corresponding to the MU-MIMO scheme that is supported.

Furthermore, according to another aspect of the present invention, there is provided a terminal apparatus that communicates with a base station apparatus which supports multiple different precoding schemes, the terminal apparatus including a receiving unit that receives from the base station apparatus multiple offset values that correspond to the multiple precoding schemes, respectively, and an addition unit that adds to a received power of a reference signal from the base station apparatus an offset value that corresponds to the precoding scheme which both of the base station apparatus and the terminal apparatus support, among the multiple offset values. With this configuration, it is possible that the terminal apparatus adds the offset value to the received power of the reference signal according to the precoding scheme that is supported.

Furthermore, in the terminal apparatus according to the present invention, the multiple precoding schemes may be a linear precoding scheme and a nonlinear precoding scheme, and the multiple offset values may include a first offset value that corresponds to a linear MU-MIMO which uses the linear precoding scheme, and a second offset value that corresponds to a nonlinear MU-MIMO which uses the nonlinear precoding scheme. With this configuration, it is possible that the terminal apparatus adds the offset value to the received power of the reference signal according to the MU-MIMO scheme that is supported.

Furthermore, in the terminal apparatus according to the present invention, in a case where both of the linear precoding scheme and the nonlinear precoding scheme are supported, the addition unit may add the second offset value to the received power of the reference signal from the base station apparatus. With this configuration, it is possible that the terminal apparatus that performs the communication using the nonlinear precoding scheme performs comparison with a result of adding the second offset value to the received power of the reference signal.

Furthermore, in the terminal apparatus according to the present invention, the second offset value may be greater than the first offset value. With this configuration, it is possible that the terminal apparatus that performs the communication using the precoding scheme corresponding to the second offset value connects preferentially to the base station apparatus.

Furthermore, in the terminal apparatus according to the present invention, the receiving unit may receive the first offset value and a value of a difference between the first offset value and the second offset value, and the addition unit may add the value of the difference to the first offset value and thus may calculate the second offset value. With this configuration, it is possible that the terminal apparatus acquires the second offset value using only the first offset value and the value of the difference and performs the comparison with the received power of the reference signal.

Furthermore, in the terminal apparatus according to the present invention, the second offset value may be a value that results from adding to the first offset value a value of a difference between a received gain in a case where the nonlinear MU-MIMO is used and a received gain in a case where the linear MU-MIMO is used. With this configuration, it is possible that the terminal apparatus performs the comparison with the received power of the reference signal based on the received gain corresponding to the MU-MIMO scheme that is supported.

Furthermore, in the terminal apparatus according to the present invention, in a case where only the linear precoding scheme is supported, the addition unit may add the first offset value to the received power of the reference signal from the base station apparatus. With this configuration, it is possible that even in a case of the terminal apparatus that supports only the linear precoding scheme, the first offset value is added and the comparison with the received power of the reference signal is performed.

Furthermore, the terminal apparatus according to the present invention may further include a comparison unit that adds the offset values to the received power of the reference signal from the base station apparatus that is a current communication destination and the received power of the reference signal from a different base station apparatus, respectively, and compares results of the addition with each other, and a transmission unit that transmits notification information that gives a notification that handover to the different base station apparatus is possible, to the base station apparatus that is the current communication destination, in a case where the received power of the reference signal from the different base station apparatus to which the offset value is added is greater than the received power of the reference signal from the base station apparatus that is the current communication destination, to which the offset value is added. With this configuration, it is possible that the cell selection (handover) that performs the comparison with the base station apparatus that is the current communication destination is performed.

Furthermore, according to a still another aspect of the present invention, there is provided a wireless communication system that includes a base station apparatus that supports multiple different precoding schemes and at least one of terminal apparatuses that communicates with the base station apparatus, in which the base station apparatus includes a transmission unit that transmits to the terminal apparatus multiple offset values that correspond to the multiple precoding schemes, respectively, and in which the terminal apparatus includes a receiving unit that receives the multiple offset values from the base station apparatus, and an addition unit that adds to a received power of a reference signal from the base station apparatus an offset value that corresponds to the precoding scheme that both of the base station apparatus and the terminal apparatus support, among the multiple offset values. With this configuration, it is possible that the base station apparatus properly sets the offset value of the received power of the reference signal according to the precoding scheme that is supported, and that the terminal apparatus adds the offset value to the received power of the reference signal according to the precoding scheme that is supported.

Furthermore, in the wireless communication system according to the present invention, the multiple precoding schemes may be a linear precoding scheme and a nonlinear precoding scheme, and the multiple offset values may include a first offset value that corresponds to a linear MU-MIMO which uses the linear precoding scheme, and a second offset value that corresponds to a nonlinear MU-MIMO which uses the nonlinear precoding scheme. With this configuration, it is possible that the base station apparatus properly sets the offset value of the received power of the reference signal according to the MU-MIMO scheme that is supported, and that the terminal apparatus adds the offset value to the received power of the reference signal according to the MU-MIMO scheme that is supported.

Furthermore, according to a still another aspect of the present invention, there is provided a processing apparatus that is used in a base station apparatus that communicates with at least one of terminal apparatuses using multiple different precoding schemes, in which the base station apparatus includes a transmission unit that transmits to the terminal apparatus multiple offset values that are to be added by the terminal apparatus to a received power of a reference signal from the base station apparatus, and in which the multiple offset values correspond to the multiple precoding schemes, respectively. With this configuration, it is possible that the processing apparatus that is used in the base station apparatus properly sets the offset value of the received power of the reference signal according to the precoding scheme that is supported.

Furthermore, in the processing apparatus according to the present invention, the multiple precoding schemes may be a linear precoding scheme and a nonlinear precoding scheme, in which the multiple offset values may include a first offset value that corresponds to a linear MU-MIMO which uses the linear precoding scheme, and a second offset value that corresponds to a nonlinear MU-MIMO which uses the nonlinear precoding scheme. With this configuration, it is possible that the processing apparatus that is used in the base station apparatus properly sets the offset value of the received power of the reference signal according to the MU-MIMO scheme that is supported.

Furthermore, according to a still another aspect of the present invention, there is provided a processing apparatus that is used in the terminal apparatus that communicates with a base station apparatus which supports multiple different precoding schemes, the processing apparatus including a receiving unit that receives from the base station apparatus multiple offset values that correspond to the multiple precoding schemes, respectively, and an addition unit that adds to a received power of a reference signal from the base station apparatus an offset value that corresponds to the precoding scheme which both of the base station apparatus and the terminal apparatus support, among the multiple offset values. With this configuration, it is possible that the processing apparatus that is used in the terminal apparatus adds the offset value to the received power of the reference signal according to the precoding scheme that is supported.

Furthermore, in the processing apparatus according to the present invention, the multiple precoding schemes may be a linear precoding scheme and a nonlinear precoding scheme, in which the multiple offset values may include a first offset value that corresponds to a linear MU-MIMO which uses the linear precoding scheme, and a second offset value that corresponds to a nonlinear MU-MIMO which uses the nonlinear precoding scheme. With this configuration, it is possible that the processing apparatus that is used in the terminal apparatus adds the offset value to the received power of the reference signal according to the MU-MIMO scheme that is supported.

Advantageous Effects of Invention

According to the present invention, because the offset value of the received power of the reference signal can be properly set according to the MU-MIMO scheme that the base station apparatus supports, the spectral efficiency can be improved in the heterogeneous network and the like.

BRIEF DESCRIPTION OF DRAWINGS

FIG. 6 is a functional block diagram illustrating a functional portion associated with cell selection (handover), of a wireless access control unit in FIG. 5.

FIG. 7 illustrates an example of setting a first offset value and a second offset value in an offset value setting unit in FIG. 6.

FIG. 11 is a flowchart illustrating one example of flow of processing associated with the handover in each of the base station apparatuses.

FIG. 12 is a flowchart illustrating one example of flow of determination processing associated with the handover in the terminal apparatus.

DESCRIPTION OF EMBODIMENTS

Figure 1:
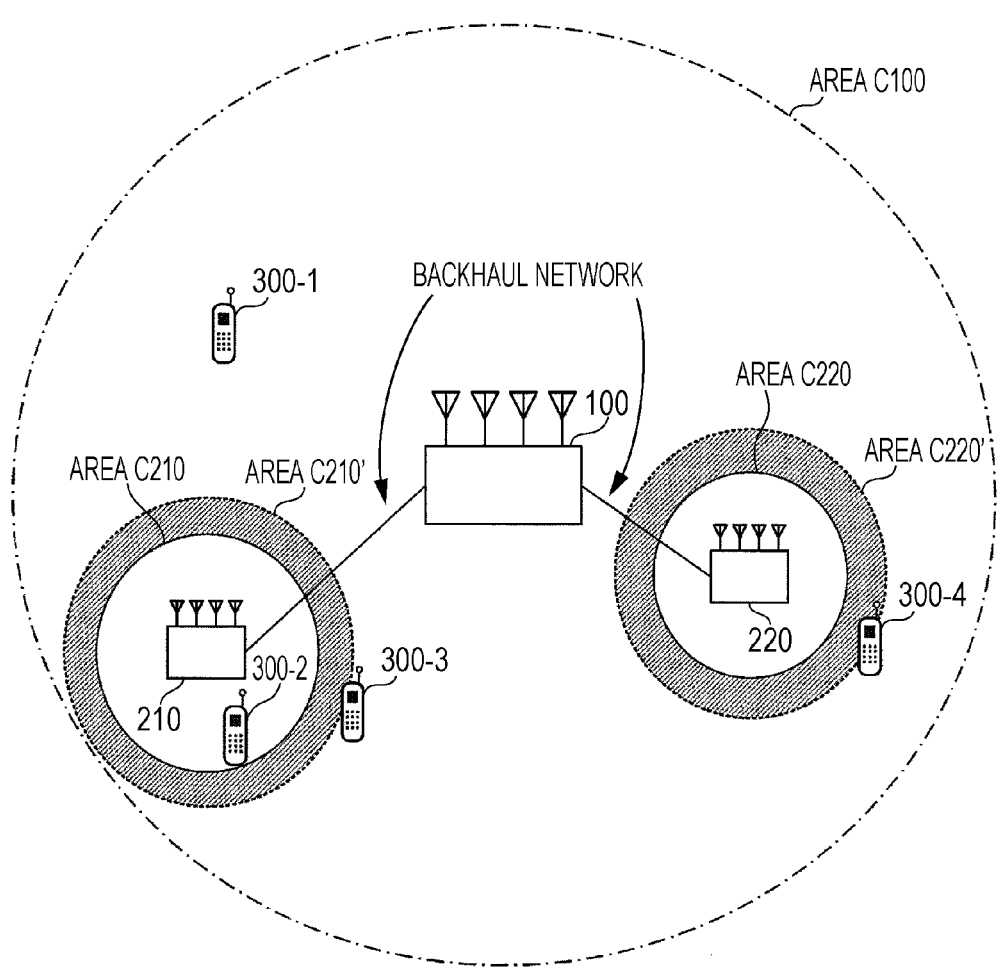
FIG. 1 is a schematic diagram illustrating one example of a wireless communication system that makes up a heterogeneous network.

Embodiments of the present invention are described below referring to the accompanying drawings. Constituent elements that have the same function are referred to by the same reference numerals in the accompanying drawings. Moreover, specific embodiments and implementation examples in accordance with the principle of the present invention are illustrated in the accompanying drawings. However, these serve to help understand the present invention and are never used for restrictively interpreting the present invention.

FIG. 1 is a schematic diagram illustrating one example of a wireless communication system that makes up a heterogeneous network.

In the wireless communication system in FIG. 1, there are a small-scale base station apparatus 210 (pico base station apparatus 210; a service area is an area C210) and a base station apparatus 220 (pico base station apparatus 220; the service area is an area C220), each of which makes up a pico cell, and terminal apparatuses 300-1 to 300-4, within a service area (area C100) of a large-scale base station apparatus 100 (macro base station apparatus 100) that makes up a macro cell. In addition, the three base station apparatuses 100, 210, and 220 are connected to one another through a wired or wireless backhaul network. Furthermore, the terminal apparatuses 300-1, 300-3, and 300-4 connect to the macro base station apparatus 100, and the terminal apparatus 300-2 connects to the pico base station apparatus 210.

Figure 2:
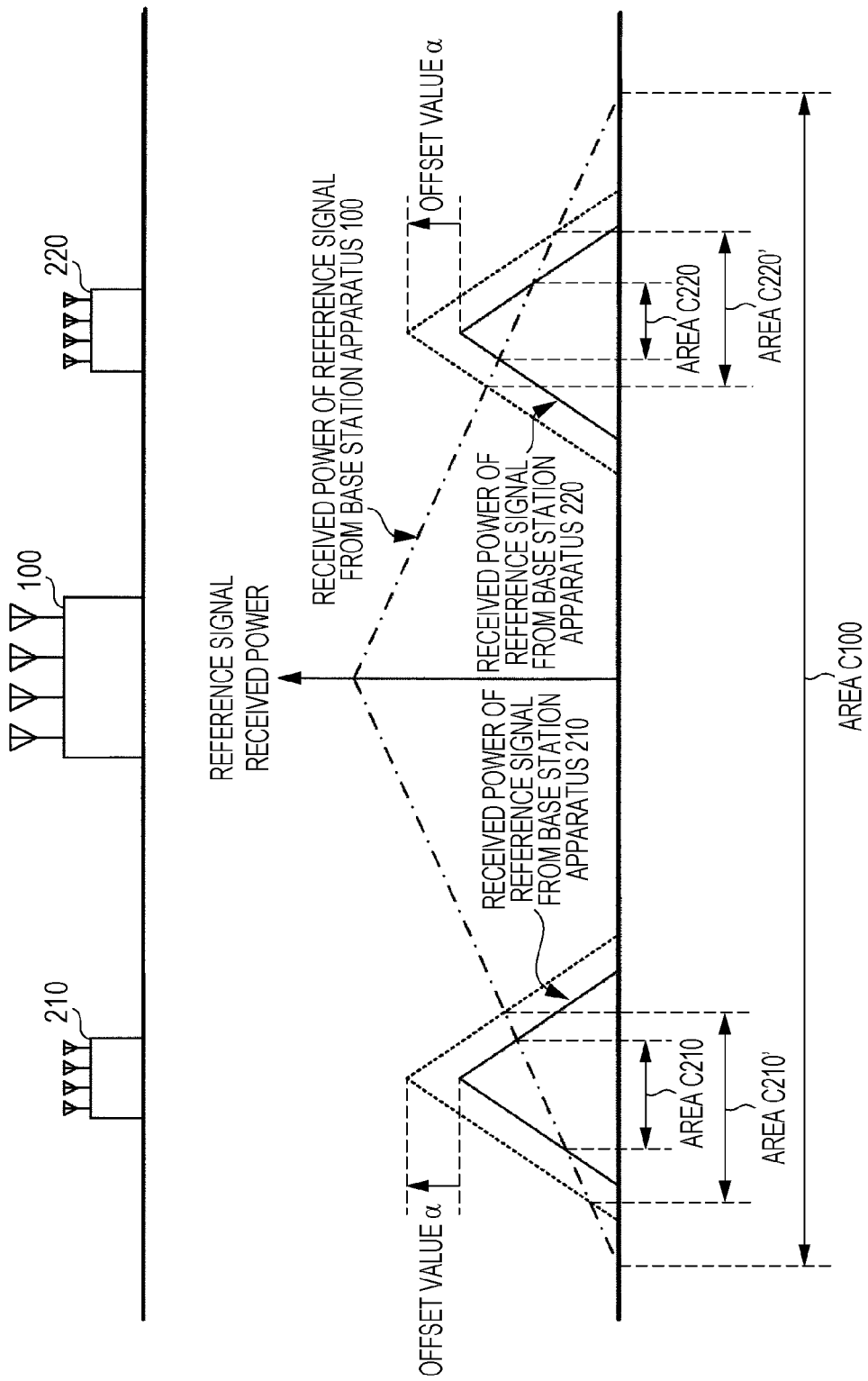
FIG. 2 is a diagram illustrating that, referring to FIG. 1, a position of each base station apparatus plotted on a horizontal axis and a received power of a reference signal that is transmitted (broadcast) from each base station apparatus plotted on the vertical axis.

The example in FIG. 1 when projected in one dimension from the side is illustrated on the upper side of FIG. 2. A case where a position of each of the base station apparatuses is plotted on a horizontal axis and a received power of a reference signal that is transmitted (broadcast) from each of the base station apparatuses is plotted on a vertical axis is illustrated on the lower side of FIG. 2. In FIG. 2, a dot and dash line indicates an amount of the received power (hereinafter referred to as a received power of the reference signal) of the reference signal from the macro base station apparatus 100 for each position on the horizontal axis, and the area C100 is a service area within which the terminal apparatus connects to the macro base station apparatus 100.

Furthermore, two solid lines indicate amounts of the received power of the reference signal from the pico base station apparatus 210 and from the pico base station apparatus 220, respectively. At this point, areas (areas C210 and C220) where the received power of the reference signal of each of the pico base station apparatuses 210 and 220 is higher than the received power of the reference signal from the macro base station apparatus 100 are the service areas within which the terminal apparatus connects to each of the pico base station apparatuses 210 and 220. That is, each terminal apparatus measures the received power of the reference signal from each of the macro base station apparatus 100 and the pico base station apparatuses 210 and 220 and compares the measured received powers of the reference signals. Then, each terminal apparatus tries to establish a connection to or handover to the base station apparatus that has the highest received power of the reference signal (the connection and the handover are hereinafter collectively referred to as cell selection).

However, in the case described above, a cell radius of each of the pico base station apparatuses 210 and 220 is extremely small due to a difference in transmitted power between the macro base station apparatus 100 and each of the pico base station apparatuses 210 and 220, compared to the cell radius of the macro base station apparatus 100. As a result, an effect of increasing system communication capacity due to the introduction of the pico base station apparatuses 210 and 220 is limited.

Then, in the wireless communication system in FIG. 2, when comparing the received powers of the reference signals, Cell Range Expansion (CRE) is performed that adds an offset value to the received power of the reference signal from each of the pico base station apparatuses 210 and 220 in such a manner that the terminal apparatus connects preferentially to the pico base station apparatuses 210 and 220. Specifically, the pico base station apparatuses 210 and 220 notify the terminal apparatus of an offset value α for the received power of the reference signal by broadcasting. The terminal apparatus compares a result of adding the offset value α to the received power of the reference signal from each of the pico base station apparatuses 210 and 220 with the received power of the reference signal from the macro base station apparatus 100, and thus performs the cell selection. Accordingly, the service areas of the pico base station apparatuses 210 and 220 are expanded, and a probability of the terminal apparatus connecting to the pico base station apparatus 210 or 220 increases.

In FIG. 2, a dotted line indicates a value that is acquired by performing the CRE that adds the offset value $\alpha$ to the received power of the reference signal from each of the pico base station apparatuses 210 and 220. In FIG. 2, the service areas of the pico base station apparatuses 210 and 220 are expanded from the original areas C210 and C220 to areas C210' and C220', respectively.

Incidentally, one purpose of the pico cell that the pico base station apparatus makes up is to provide transmission higher in spectral efficiency than the macro cell to the terminal apparatus in the neighborhood of the pico base station apparatus. To do so, for example, it is important to introduce a technology that enables high-efficiency transmission, such as MU-MIMO.

The MU-MIMO (linear MU-MIMO) that uses a linear precoding is employed in LTE, LTE-Advanced, and the like. In addition, in some cases, the MU-MIMO (nonlinear MIMO) that greatly improves transmitted power efficiency, can greatly improve transmission performance, and uses nonlinear precoding is introduced. In this case, a situation is assumed in which the pico base station apparatus (in the related art) supporting only the linear MU-MIMO and the pico base station apparatus supporting both of the linear MU-MIMO and the nonlinear MU-MIMO are present in a mixed manner, or a situation is assumed in which the terminal apparatus (in the related art) supporting only the linear MU-MIMO for receiving and the terminal apparatus supporting the linear MU-MIMO and the nonlinear MU-MIMO for receiving are present in a mixed manner. In such a situation, because transmission efficiency of the MU-MIMO greatly changes depending on which precoding scheme is used, the optimal cell selection cannot be realized with a method of performing the CRE based on the same offset value.

In the wireless communication system according to the first embodiment of the present invention, multiple offset values are set that correspond to the precoding scheme used by the MU-MIMO for each of the pico base station apparatuses 210 and 220. Then, in a case where each terminal apparatus selects a cell as a connection destination, or in a case where the handover that changes the cell which is the connection destination takes place, a suitable value is selected from among the multiple offset values, the selected suitable value is added to the received power of the reference signal from each of the pico base station apparatuses 210 and 220, and thus processing is performed that compares a result of the addition with the received power of the reference signal from the macro base station apparatus 100.

Moreover, generally, an offset value that results from considering hysteresis for the base station apparatus to which the terminal apparatus connects is separately introduced in order to prevent the repeated handover from frequently occurring between the two (or more) base station apparatuses due to a minute change in the received power of the reference signal. According to the present embodiment, a description of the hysteresis is omitted for simplification, but it is preferable to use the offset value for the hysteresis along with the offset value for the CRE.

Figure 3:
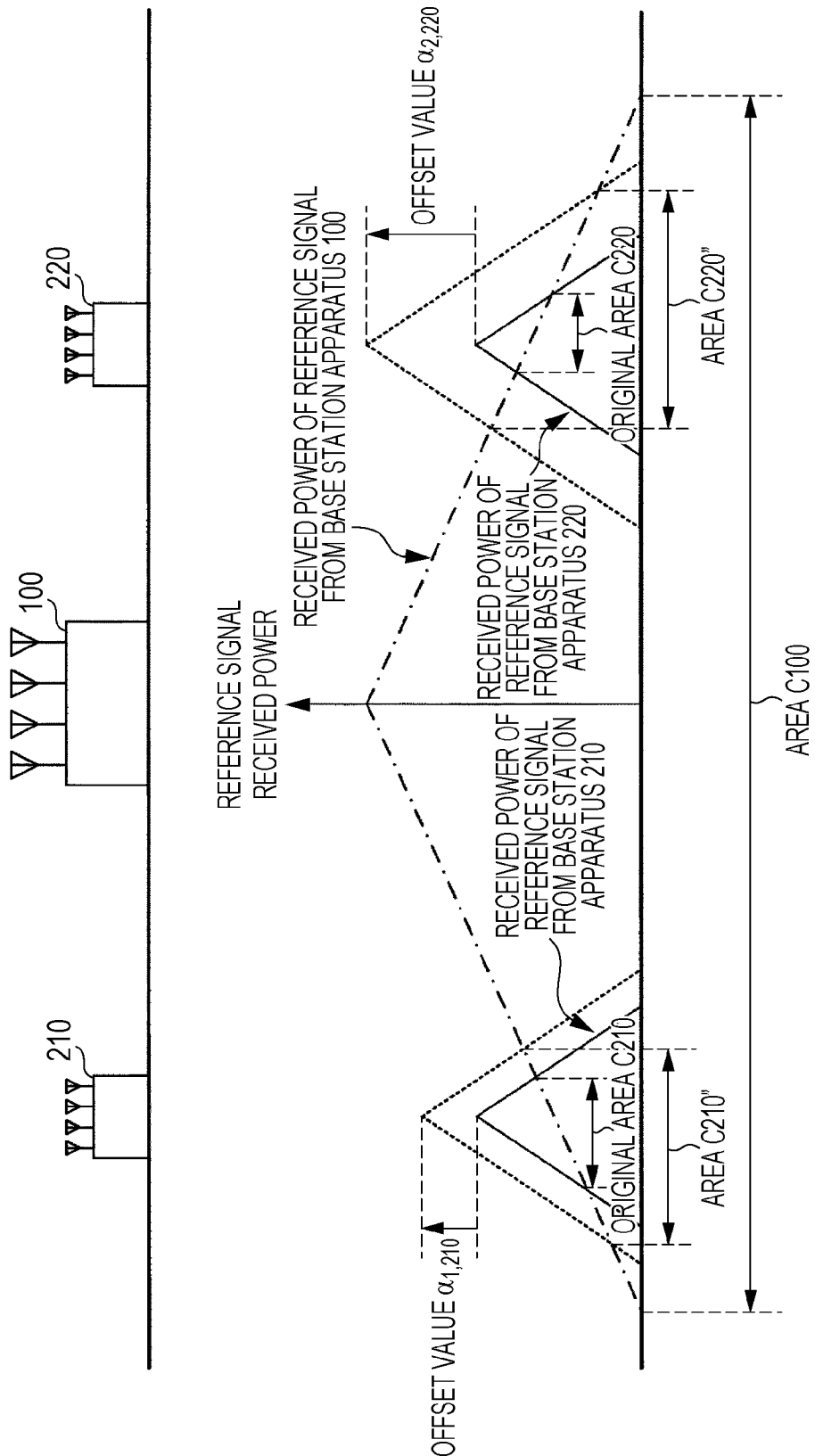
FIG. 3 is a diagram illustrating that, referring to FIG. 1, the position of each base station apparatus is plotted on the horizontal axis and the received power of the reference signal that is transmitted (broadcast) from each base station apparatus is plotted on the vertical axis and illustrating an example in which two types of offset values that correspond to precoding schemes, respectively, are set.

FIG. 3 is a diagram illustrating that the position of each of the base station apparatuses is plotted on the horizontal axis and the received power of the reference signal that is transmitted (broadcast) from each of the base station apparatuses is plotted on the vertical axis. In an example in FIG. 3, two types, linear precoding and nonlinear coding, are used as the precoding scheme that is to be used by the MU-MIMO, and two types of the offset values (a first offset value $\alpha_1$ and a second offset value $\alpha_2$) are set that correspond to the precoding schemes, respectively.

In FIG. 3, the pico base station apparatus 210 is set to be the pico base station apparatus (in the related art) (hereinafter referred to as a first pico base station apparatus) supporting only the linear MU-MIMO, and the terminal apparatus is set to be notified, by broadcasting, of only the first offset value $\alpha_1$ ($\alpha_{1,210}$) that presupposes the linear MU-MIMO.

Furthermore, the pico base station apparatus 220 is set to be the pico base station apparatus (hereinafter referred to as a second pico base station apparatus) supporting both of the linear MU-MIMO and the nonlinear MU-MIMO, and the terminal apparatus is set to be notified, by broadcasting, of the first offset value $\alpha_1$ ($\alpha_{1,220}$: for the linear MU-MIMO) and the second offset value $\alpha_2$ ($\alpha_{2,220}$: for the nonlinear MU-MIMO).

The two types, the offset values $\alpha_1$ and $\alpha_2$ are set to be $\alpha_1 < \alpha_2$, based on a difference in power gain between the linear MU-MIMO and the nonlinear MU-MIMO. For example, when the difference in power gain between the linear MU-MIMO and the nonlinear MU-MIMO is $\beta$, it is preferable to set the offset values $\alpha_1$ and $\alpha_2$ to be $\alpha_2 = \alpha_1 + \beta$. For example, FIG. 2 in NPL 4 is a graph illustrating error rate characteristics that result when error correction coding is not applied during the time when 16 Quadrature Amplitude Modulation (QAM) is performed, in a case where the number of spatial multiplexing=the number of multiple users=10. In a case where the two types of the offset values are set based on the graph, when a necessary signal-to-noise power ratio (SNR) serves as a reference for an error rate of 0.1, there is a difference of approximately 7 dB between the linear MU-MIMO (regularized inversion in the graph) and the nonlinear MU-MIMO (a sphere encoder and a Reg. sphere encoder in the graph). For this reason, an equation is set to be $\beta=7$ dB.

Furthermore, instead of the second offset value $\alpha_2$, a difference value of $\delta(=\beta)$ between the second offset value and the first offset value $\alpha_1$ may be notified. In this case, the terminal apparatus receives the first offset value $\alpha_1$ and a difference value of $\delta$. Then, the terminal apparatus adds the first offset value $\alpha_1$ and the difference value of $\delta$ that are notified and calculates the second offset value $\alpha_2$. Other processing may not be changed.

Moreover, a method of setting the two types of the offset values is not limited to this, and for example, the value of $\beta$ may be adaptively set based on the number of spatial multiplexing or a positional relationship between the pico base station apparatus and the macro base station apparatus.

Referring to the example in FIG. 3, processing by the terminal apparatus supporting both of the linear MU-MIMO and the nonlinear MU-MIMO for receiving is described. In this case, for the pico base station apparatus 210 that is the first pico base station apparatus, the terminal apparatus compares a result of adding the first offset value $\alpha_{1,210}$ for the linear MU-MIMO to the received power of the reference signal with the received power of the reference signal from the macro base station apparatus 100. Then, the terminal apparatus performs the cell selection, using a result of the comparison.

Furthermore, for the pico base station apparatus 220 that is the second pico base station apparatus, the terminal apparatus compares a result of adding the second offset value $\alpha_{2,220}$ for the nonlinear MU-MIMO to the received power of the reference signal with the received power of the reference signal from the macro base station apparatus 100, and thus performs cell selection processing.

In FIG. 3, a value that is acquired by adding the first offset value $\alpha_{1,210}$ and the second offset value $\alpha_{2,220}$ to the received power of the reference signal from each of the pico base station apparatuses 210 and 220 is indicated by a dotted line, and the service areas of the pico base station apparatuses 210 and 220 are expanded from the original areas C210 and C220 to areas C210" and C220", respectively. The service area of the pico base station apparatus 220 supporting the nonlinear MU-MIMO has a higher expansion rate than the service area of the pico base station apparatus 210 supporting only the linear MU-MIMO.

Moreover, for any one of the pico base station apparatuses 210 and 220, the terminal apparatus supporting only the linear MU-MIMO for receiving compares a result of adding the first offset value $\alpha_{1,210}$ or $\alpha_{1,220}$ for the linear MU-MIMO to the received power of the reference signal with the received power of the reference signal from the macro base station apparatus 100, and thus performs the cell selection processing.

Figure 4:
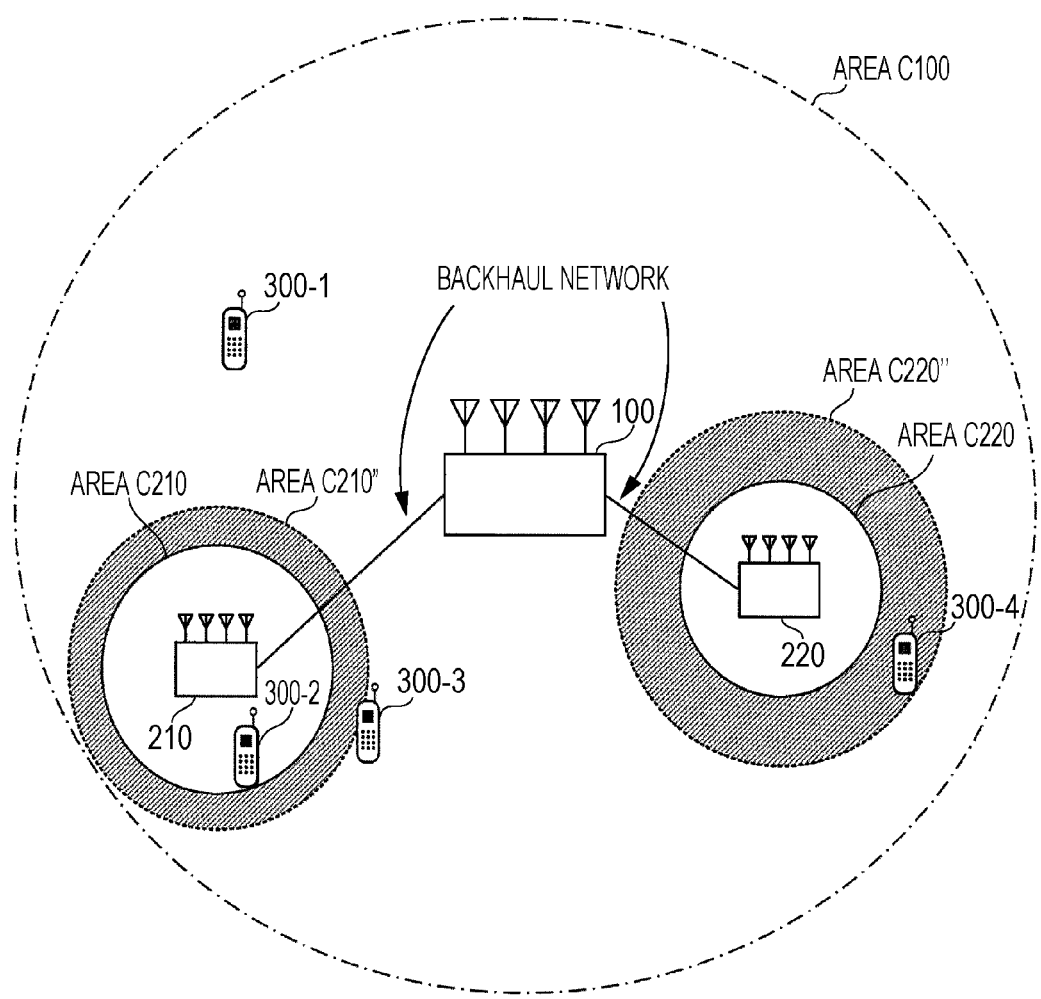
FIG. 4 is a schematic diagram illustrating one example of a cell configuration in FIG. 3 in a wireless communication system according to a first embodiment of the present invention.

FIG. 4 is a schematic diagram illustrating one example of a cell configuration in FIG. 3 in the wireless communication system according to the first embodiment of the present invention. In FIG. 4, the same constituent elements as those in FIG. 3 are given the same reference numerals and descriptions of the same constituent elements are omitted.

In the wireless communication system in FIG. 4, there are present a service area (area C210") that is expanded by the first offset value $\alpha_{1,210}$ (refer to FIG. 3) of the pico base station apparatus 210 that makes up the pico cell and a service area (region C220") that is expanded by the second offset value $\alpha_{2,220}$ (refer to FIG. 3) of the pico base station apparatus 220, within the service area (area C100) of the macro base station apparatus 100 that makes up the macro cell. Furthermore, the terminal apparatus 300-4 is positioned within the expanded service area (region C220") of the pico base station apparatus 220 supporting the nonlinear MU-MIMO, and selects the pico cell that the pico base station apparatus 220 makes up.

Moreover, it is preferable that each of the offset values be transmitted in a state where each of the offset values is included in cell information that is broadcast from each of the pico base station apparatuses 210 and 220, but the transmission of each of the offset values is not limited to this.

Figure 5:
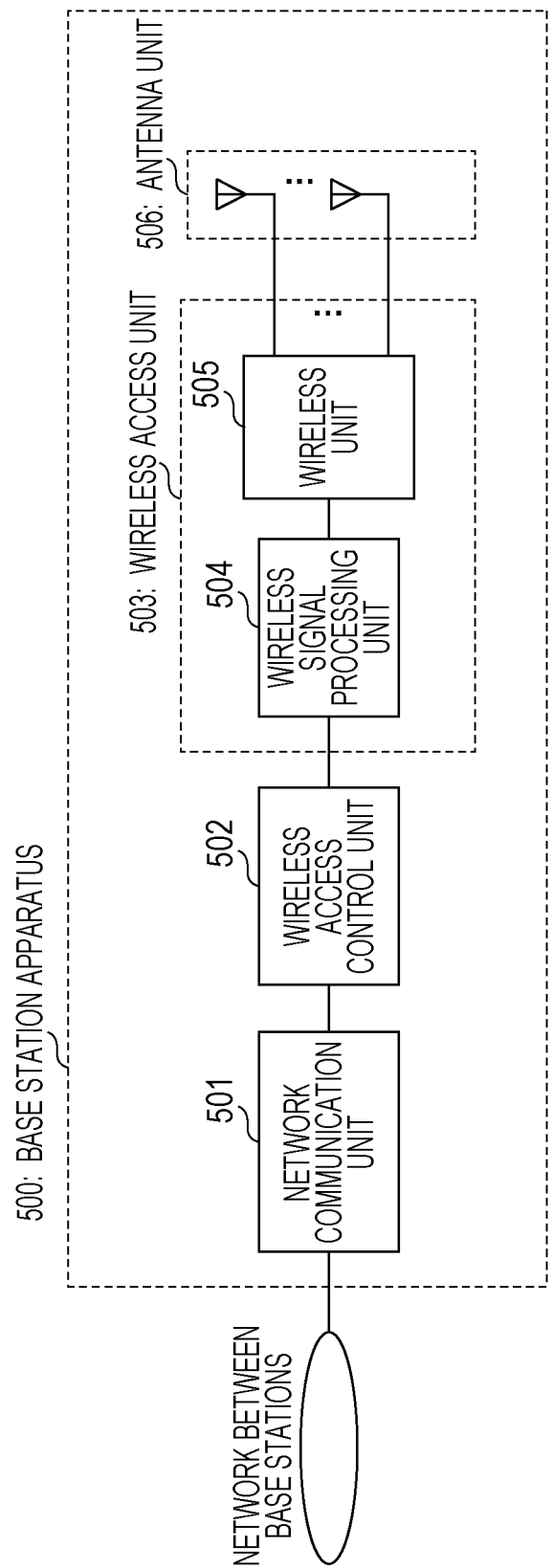
FIG. 5 is a functional block diagram illustrating one configuration example of a base station apparatus according to the first embodiment of the present invention.

FIG. 5 is a functional block diagram illustrating one configuration example of a base station apparatus 500 according to the first embodiment of the present invention. Moreover, the configuration example of the base station apparatus 500 in FIG. 5 is common to any one of the macro base station apparatus 100, the pico base station apparatus 210, and the pico base station apparatus 220.

The base station apparatus 500 is configured from a network communication unit 501, a wireless access control unit 502, a wireless access unit 503, and an antenna unit 506. In addition, the wireless access unit 503 is configured from a wireless signal processing unit 504 and a wireless unit 505.

The network communication unit 501 connects to a network between base stations of a cellular system. Furthermore, the network communication unit 501 performs processing that transmits and receives data, control information, or the like over the network between the base stations, and processing that inputs and outputs the data, the control information, or the like into and from the wireless access control unit 502.

The wireless access control unit 502 controls the wireless access unit 503 and controls communication between the base station apparatus 500 and each terminal apparatus. Specifically, the wireless access control unit 502 performs processing, such as scheduling of downlink communication and uplink communication between the base station apparatus 500 and each terminal apparatus, generating of the control information for each terminal apparatus, converting between a data packet on the network between the base stations and a data packet in a wireless access zone, and controlling of the handover.

The wireless access unit 503 performs wireless communication with each terminal apparatus through the antenna unit 506. Specifically, the wireless signal processing unit 504 performs processing, such as error correction coding or modulating, on the transmitted data or the control information that is input from the wireless access control unit 502. Furthermore, the wireless signal processing unit 504 adds an identifiable reference signal to every base station apparatus (to every cell) and thus generates a baseband signal. The wireless unit 505 converts (up-converts) the generated baseband signal into a wireless signal (RF signal). Furthermore, the wireless unit 505 receives the wireless signal that is transmitted by each terminal apparatus, through the antenna unit 506 and converts (down-converts) the received wireless signal from the wireless signal into the baseband signal. The wireless signal processing unit 504 performs processing such as demodulating or error correction decoding, and thus outputs the received data to the wireless access control unit 502.

The antenna unit 506 transmits the wireless signal generated by the wireless access unit 503 toward each terminal apparatus, and receives the wireless signal transmitted by each terminal apparatus.

FIG. 6 illustrates one configuration example of a functional portion associated with the cell selection (handover), of the wireless access control unit 502 in FIG. 5.

In FIG. 6, the wireless access control unit 502 is configured to include an offset value setting unit 601, an offset value notification information generation unit 602, a result-of-determination notification information acquisition unit 603, a handover control unit 604, and a handover command generation unit 605.

The offset value setting unit 601 sets the offset value that is added to the received power of the reference signal from each of the base station apparatuses in order for each terminal apparatus to perform the cell selection, based on a type (the macro base station apparatus or the pico base station apparatus) of the base station apparatus to which the offset value setting unit 601 belongs and on a MU-MIMO scheme (only the linear MU-MIMO is supported or both of the linear MU-MIMO and the nonlinear MU-MIMO are supported) that is supported.

The offset value notification information generation unit 602 generates offset value notification information for notifying each offset value being set in the offset value setting unit 601 of the terminal apparatus and outputs the generated offset value notification information to the wireless access unit 503.

The result-of-determination notification information acquisition unit 603 acquires result-of-determination notification information that is notified in a case where each of the terminal apparatus compares the received power of the reference signal from the base station apparatus, which each terminal apparatus connects currently to and performs the communication with (each terminal apparatus is in a service area of the base station), with a result of adding the offset value to the received power of the reference signal from a different base station apparatus, and thus it is determined that the different base station apparatus is the one that each terminal apparatus has to hand over to.

The handover control unit 604 determines whether or not a handover approval is given to the terminal apparatus that notifies the result-of-determination notification information, based on the result-of-determination notification information that is acquired in the result-of-determination notification information acquisition unit 603 or on quality of service (QoS) of communication data between the base station apparatus and the terminal apparatus. In a case where the handover is approved, the handover control unit 604 makes a handover request to the base station apparatus to which the terminal apparatus hands over, through the network communication unit 501 over the network between the base stations. Thereafter, in a case where the base station to which the terminal apparatus hands over responds with a handover acknowledgment (ACK), the handover control unit 604 instructs the handover command generation unit 605 to transmit a handover command to the terminal apparatus. Moreover, in a case where the base station does not respond with the handover acknowledgment (in a case where the base station responds with a handover negative acknowledgment (NAK)), the handover is discontinued.

According to an instruction from the handover control unit 604, the handover command generation unit 605 generates the handover command to instruct the terminal apparatus that wants to execute the handover to execute the handover and outputs the generated handover command to the wireless access unit 503.

FIG. 7 illustrates an example of setting the first offset value and the second offset value in the offset value setting unit 601 in FIG. 6. FIG. 7 illustrates an example in which according to the type of the base station apparatus to which the offset value setting unit 601 belongs and the MU-MIMO scheme that is supported, the base station apparatuses are categorized by case into four types, and thus each of the first offset value and the second offset value is set.

In the example in FIG. 7, the macro base station apparatus (hereinafter referred to as a first macro base station apparatus) supporting only the linear MU-MIMO and the first pico base station apparatus supporting only the linear MU-MIMO do not support the nonlinear MU-MIMO. That is, the first macro base station apparatus and the first pico base station apparatus are assumed to be the base station apparatuses in the related art that do not have a mechanism such as the control information relating to the nonlinear MU-MIMO, and thus only the first offset value is set and the second offset value is neither set nor notified to each terminal apparatus.

Furthermore, the macro base station apparatus (hereinafter referred to as a second macro base station apparatus) supporting both of the linear MU-MIMO and the nonlinear MU-MIMO and the second pico base station apparatus supporting both of the linear MU-MIMO and the nonlinear MU-MIMO are set to have the two offset values, the first offset value and the second offset value.

Moreover, according to the present embodiment, because a purpose of enabling off-loading on the pico cell present within the macro cell is to be served, any one of the offset values is set to 0 in the first and second macro base station apparatuses. Furthermore, the second offset value may be set to be greater than 0, for example, β, in the macro base station apparatus (hereinafter referred to as the second macro base station apparatus) supporting both of the linear MU-MIMO and the nonlinear MU-MIMO.

Furthermore, in the second pico base station apparatus, the first offset value is set to $\alpha_1$, and the second offset value is set to $\alpha_2$. At this point, the second offset value $\alpha_2$ is a value that is greater by β (β>0) than the first offset value $\alpha_1$.

Figure 8:
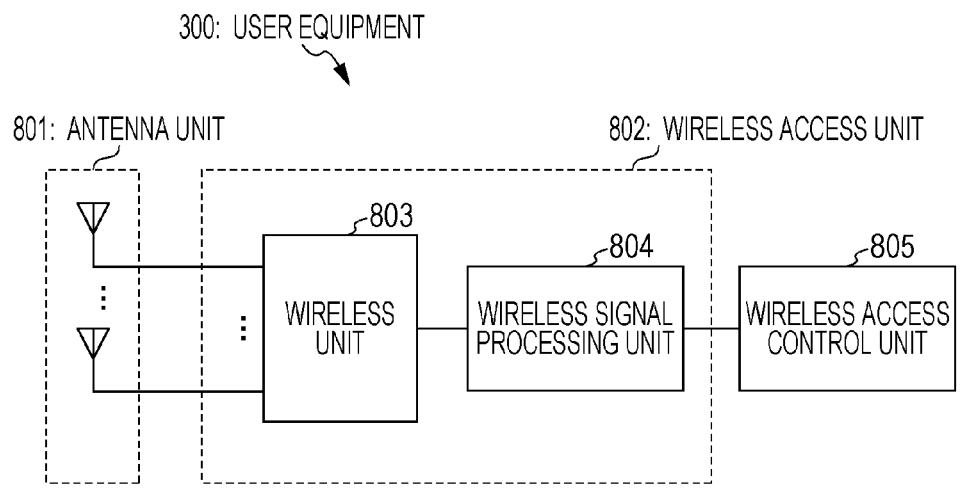
FIG. 8 is a functional block diagram illustrating one configuration example of a terminal apparatus according to the first embodiment of the present invention.

FIG. 8 is a functional block diagram illustrating one configuration example of the terminal apparatus 300 according to the first embodiment of the present invention. Moreover, the configuration example of the terminal apparatus 300 in FIG. 8 corresponds to the terminal apparatuses 300-1 to 300-4 in FIGS. 1 and 4.

The terminal apparatus 300 is configured from an antenna unit 801, a wireless access unit 802, and a wireless access control unit 805. In addition, the wireless access unit 802 is configured from a wireless unit 803 and a wireless signal processing unit 804.

The antenna unit 801 receives the wireless signal transmitted by the base station apparatus (the macro base station apparatus or the pico base station apparatus), and transmits the wireless signal generated by the wireless access unit 802 toward the base station apparatus.

The wireless access unit 802 performs the wireless communication with the base station apparatus through the antenna unit 801. Specifically, the wireless access unit 802 receives the wireless signal transmitted by the base station apparatus through the antenna unit 801. Then, the wireless unit 803 converts (down-converts) the wireless signal into the baseband signal. The wireless signal processing unit 804 detects the reference signal from each of the base station apparatuses, and measures the received power of the reference signal and thus outputs the measured received power to the wireless access control unit 805. In addition, the wireless signal processing unit 804 detects a signal of the control information including the cell information, the offset value notification information, the handover command, and the like, and a data signal, performs demodulating of the signals or the error correction decoding, and thus outputs the control information and received data to the wireless access control unit 805. Furthermore, the wireless signal processing unit 804 performs the error correction coding, the modulating, or the like on transmitted data and the control information including the result-of-determination notification information and the like, which are input from the wireless access control unit 805, and thus generates the baseband signal. Then, the wireless unit 803 converts (up-converts) the baseband signal into the wireless signal (RF signal).

The wireless access control unit 805 controls the wireless access unit 802 and controls communication between the terminal apparatus 300 to which the wireless access control unit 805 belongs and the base station apparatus. Specifically, the wireless access control unit 805 performs processing, such as the cell selection, the determination of whether to execute the handover, the generation of the control information for the base station apparatus, and the conversion between the high-layer data packet of the terminal apparatus and the data packet in the wireless access zone.

Figure 9:
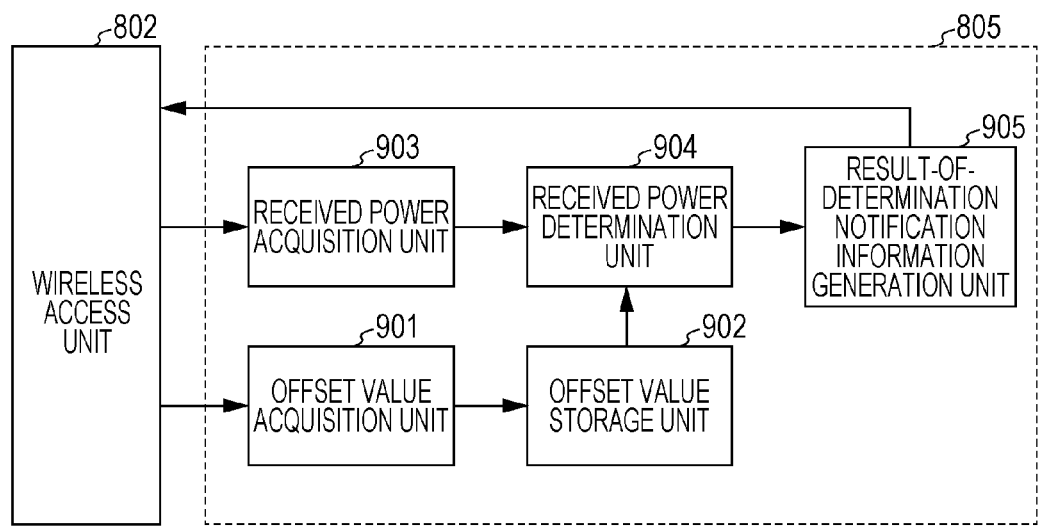
FIG. 9 is a functional block diagram illustrating a functional portion associated with the cell selection (handover), of a wireless access control unit in FIG. 8.

FIG. 9 illustrates one configuration example of a detailed functional block of the functional portion associated with the cell selection (handover), of the wireless access control unit 805 in FIG. 8.

In FIG. 9, the wireless access control unit 805 is configured to include an offset value acquisition unit 901, an offset value storage unit 902, a received power acquisition unit 903, a received power determination unit 904, and a result-of-determination notification information generation unit 905.

The offset value acquisition unit 901 acquires the first offset value that is notified from each of the base station apparatuses, from the control signal received in the wireless access unit 802. Furthermore, in a case where the base station apparatus is the second macro base station apparatus or the second pico base station apparatus, in addition to the first offset value, the offset value acquisition unit 901 acquires the second offset value as well.

Each offset value for every base station apparatus, which is acquired in the offset value acquisition unit 901, is stored in the offset value storage unit 902. The received power acquisition unit 903 acquires a result of measuring in the wireless access unit 802 the received power of the reference signal from each of the base station apparatuses.

The received power determination unit 904 adds the offset value of each of the base station apparatuses, which is stored in the offset value storage unit 902, to the result of measuring the received power of the reference signal from each of the base station apparatuses, which is acquired in the received power acquisition unit 903. In a case where a base station apparatus is present that has a better result of the addition than the base station apparatus that connects currently to and performs the communication with, the received power determination unit 904 determines that the handover is executed in such a manner that the base station apparatus that has the higher result serves as a base station apparatus to which the terminal apparatus hands over, and outputs a result of the determination to the result-of-determination notification information generation unit 905.

Moreover, in a case where each of the terminal apparatus does not connect to any base station apparatus, for the initial cell selection, the received power determination unit 904 determines that the base station apparatus having the maximum result of the addition is the base station apparatus as the connection destination. At this point, in a case where the terminal apparatus to which the received power determination unit 904 belongs supports only the linear MU-MIMO for receiving, the first offset value is used as the offset value that is added to the result of measuring the received power of the reference signal from each of the base station apparatuses. In a case where the terminal apparatus to which the received power determination unit 904 belongs supports both of the linear MU-MIMO and the nonlinear MU-MIMO for receiving, and the target base station apparatus supports the nonlinear MU-MIMO as well, the second offset value is used. Furthermore, in a case where the terminal apparatus to which the received power determination unit 904 belongs supports both of the linear MU-MIMO and the nonlinear MU-MIMO for receiving, and the target base station apparatus supports only the linear MU-MIMO, the first offset value is used.

In a case where the result of the determination that the handover is executed is input from the received power determination unit 904, the result-of-determination notification information generation unit 905 generates the result-of-determination notification information that includes the result of the determination that the handover has to be executed and the information designating the base station apparatus to which the terminal apparatus hands over, and outputs the generated result-of-determination notification information to the wireless access unit 802.

Figure 10:
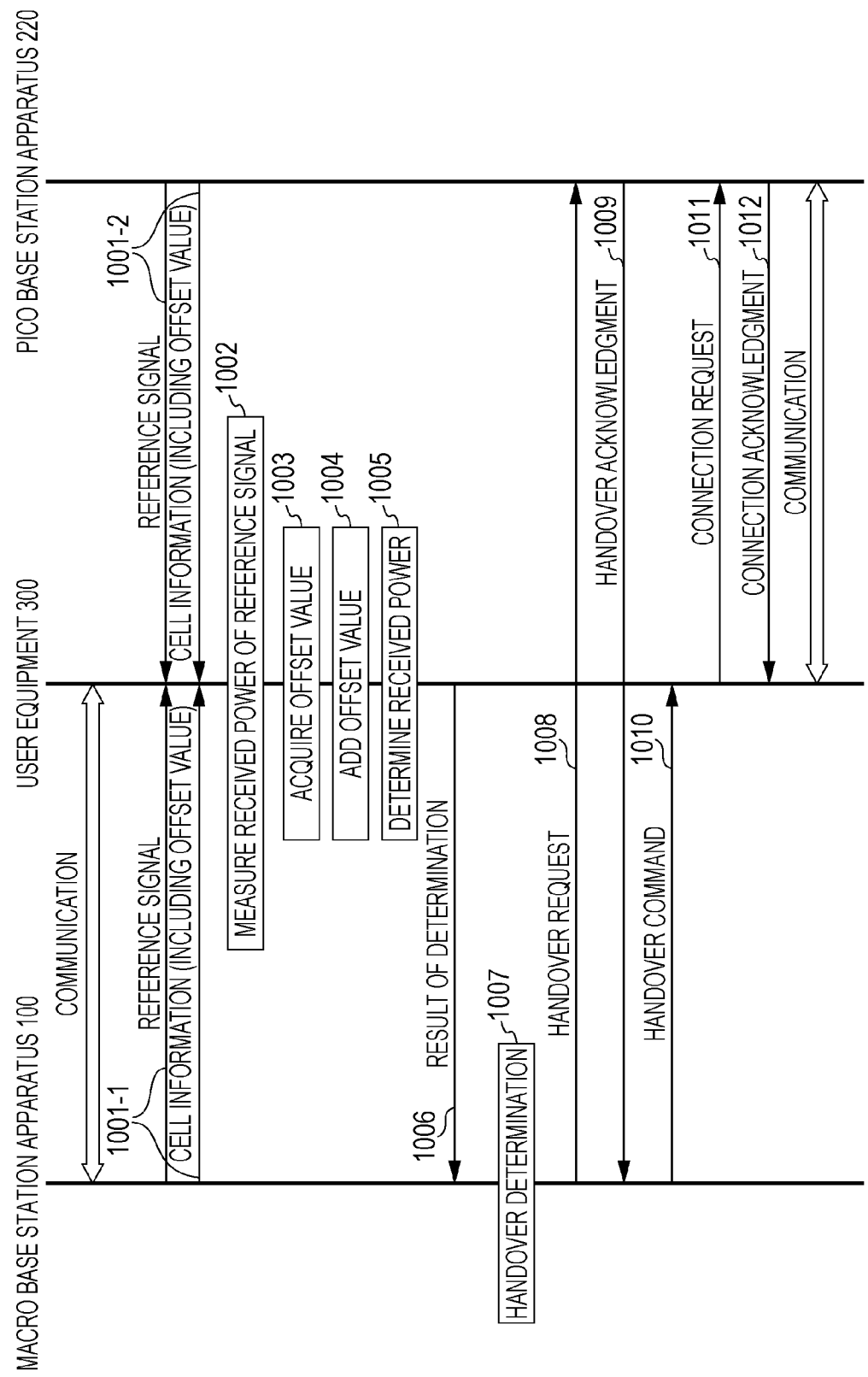
FIG. 10 is a diagram illustrating one example of a sequence chart associated with a handover between a macro base station apparatus, a pico base station apparatus present within a macro cell that the macro base station apparatus makes up, and the terminal apparatus.

FIG. 10 is a diagram illustrating one example of a sequence chart associated with the handover between the macro base station apparatus 100, the pico base station apparatus 220 present within the macro cell that the macro base station apparatus 100 makes up, and the terminal apparatus 300. Moreover, the macro base station apparatus 100 and the pico base station apparatus 220 are all described below as being set to support both of the linear MU-MIMO and the nonlinear MU-MIMO, and the terminal apparatus 300 as being set to support both of the linear MU-MIMO and the nonlinear MU-MIMO for receiving.

First, it is assumed that the terminal apparatus 300 has already connected to and is now communicating with the macro base station apparatus 100. A base station apparatus to which a certain terminal apparatus has connected is hereinafter referred to as a "serving base station apparatus" of the terminal apparatus, and a cell that the serving base station apparatus makes up is hereinafter referred to as a "serving cell." Furthermore, a base station apparatus that is a candidate for a base station apparatus to which a certain terminal apparatus hands over is referred to as a "neighbor base station apparatus" of the terminal apparatus, and a cell that the neighbor base station apparatus makes up is referred to as a "neighbor cell."

The macro base station apparatus 100 and the pico base station apparatus 220 periodically transmit the reference signal and the cell information including the offset value to the terminal apparatus 300 (1001-1 and 1001-2). The terminal apparatus 300 receives the reference signal from each of the base station apparatuses 100 and 220, and measures the received power of the reference signal (1002).

Furthermore, the terminal apparatus 300 acquires the offset value (which is the first offset value, but in a case where the base station apparatus supports both of the linear MU-MIMO and the nonlinear MU-MIMO, the first offset value and the second offset value) that is included in the cell information (1003).

The terminal apparatus 300 adds the first offset value or the second offset value, which is acquired as described above, to the measured received power of the reference signal from each of the base station apparatuses 100 and 220 according to the MU-MIMO scheme which each of the base station apparatuses 100 and 220 supports (1004).

The terminal apparatus 300 compares the result of adding the offset value (in this example, the second offset value) to the received power of the reference signal from the macro base station apparatus 100 that is the serving base station apparatus and the result of adding the offset value (in this case, the second offset value) to the received power of the reference signal from the pico base station apparatus 220 that is the neighbor base station apparatus. Then, in a case where the pico base station apparatus 220 has the better result of the addition, the terminal apparatus 300 determines that the terminal apparatus 300 has to execute the handover in such a manner that the pico base station apparatus 220 serves as a base station apparatus to which the terminal apparatus 300 hands over (1005).

The terminal apparatus 300 notifies the macro base station apparatus 100, which is the serving base station apparatus, of the result of the handover determination that the pico base station apparatus 220, which is the neighbor base station apparatus, serves as a base station apparatus to which the terminal apparatus hands over (1006).

When the result of the handover determination is received from the terminal apparatus 300, the macro base station apparatus 100 determines whether or not the handover is approved, based on a traffic situation of the serving cell that the macro base station apparatus itself makes up, a traffic situation of the neighbor cell that the pico base station apparatus 220 to which the terminal apparatus hands over makes up, the quality of service (QoS) of the communication data between the macro base station apparatus 100 and the terminal apparatus 300, and so forth (1007).

If it is determined that the handover is approved, the macro base station apparatus 100 notifies the pico base station apparatus 220, to which the terminal apparatus hands over, of the handover request over the network between the base stations (1008).

When the handover request is received, the pico base station apparatus 220 notifies the serving base station apparatus (macro base station apparatus 100), which is a notification source, of the handover acknowledgment over the network between the base stations (1009). Moreover, in a case where the handover is not accepted for any reason, such as when there is no enough room in accommodation capacity, instead of the handover acknowledgment, the pico base station apparatus 220 notifies the handover negative acknowledgment.

When the handover acknowledgment is received from the pico base station apparatus 220 to which the terminal apparatus hands over, the macro base station apparatus 100 notifies the handover command to instruct the terminal apparatus 300 to execute the handover (1010). When the handover command is received, the terminal apparatus 300 notifies a connection request of the pico base station apparatus 220 to which the terminal apparatus hands over (1011).

When the connection request is received from the terminal apparatus 300, the pico base station apparatus 220 notifies the terminal apparatus 300 of a connection acknowledgment (1012). Thereafter, according to a procedure for establishing a connection between the terminal apparatus 300 and the pico base station apparatus 220, the terminal apparatus 300 continues to communicate with the pico base station apparatus 220 as a new connection destination.

FIG. 11 is a flowchart illustrating one example of flow of processing associated with the handover in each of the base station apparatuses. In the following flowchart, it is assumed that the base station apparatus supports both of the linear MU-MIMO and the nonlinear MU-MIMO and that the base station apparatus supports only the linear MU-MIMO.

First, the base station apparatus sets the first offset value $\alpha_1$ according to the type of the base station apparatus itself and the MU-MIMO scheme that is supported. Moreover, in a case where the base station apparatus itself supports both of the linear MU-MIMO and the nonlinear MU-MIMO, the base station apparatus sets the first offset value $\alpha_1$ and the second offset value $\alpha_2$ (Step S1101).

Next, the base station apparatus transmits the reference signal and the cell information that is information relating to the cell that the base station apparatus itself makes up, to the terminal apparatus by periodic broadcasting (Step S1102). At this point, in a case where the base station apparatus supports both of the linear MU-MIMO and the nonlinear MU-MIMO, the cell information includes the first offset value $\alpha_1$ and the second offset value $\alpha_2$. Furthermore, in a case where the base station apparatus supports only the linear MU-MIMO, the cell information includes only the first offset value $\alpha_1$.

Next, in a case where the result of the determination of whether the handover is executed is notified from the terminal apparatus that connects to the base station apparatus itself (Yes in Step S1103), proceeding to Step S1104 takes place. Moreover, in a case where the result of the determination is not notified (No in Step S1103), proceeding to Step S1108 takes places.

Next, in a case where the result of the determination of whether the handover is executed is notified, in Step S1104, the base station apparatus determines whether or not the handover is approved. In a case where the handover is approved (Yes in Step S1104), the base station apparatus notifies the base station apparatus, to which the terminal apparatus hands over, of the handover request of the target terminal apparatus over the network between the base stations (Step S1105).

Next, in a case where the acknowledgement to the handover request is received (Yes in Step S1106), the base station apparatus transmits to the target terminal apparatus the handover command to instruct the target terminal apparatus to execute the handover (Step S1107). Moreover, in a case where the acknowledgement to the handover request is not received, or in a case where the negative acknowledgment is received (No in Step S1106), the base station apparatus discontinues the handover and proceeds to Step S1108.

Next, in a case where the handover request is not received from a different base station apparatus over the network between the base stations (No in Step S1108), the base station apparatus terminates the processing. Furthermore, in a case where the handover request is received from the different base station apparatus (the base station apparatus from which the terminal apparatus hands over) (Yes in Step S1108), the base station apparatus notifies the base station apparatus from which the terminal apparatus hands over, and which notifies the handover acknowledgment (Step S1109).

Thereafter, according to the connection request from the handover target terminal apparatus, the base station apparatus establishes the connection to the handover target terminal apparatus (Step S1110).

FIG. 12 is a flowchart illustrating one example of flow of determination processing associated with the handover in the terminal apparatus. In FIG. 12, it is assumed that the terminal apparatus supports both of the linear MU-MIMO and the nonlinear MU-MIMO for receiving. Furthermore, in the example in FIG. 12, the base station apparatus assumes that the serving base station apparatus and one neighbor base station apparatus (observable from the terminal apparatus) are present.

The terminal apparatus first receives the reference signal transmitted from each of the base station apparatuses, and measures a received power $P_{SRV}$ of the reference signal from the serving base station apparatus and a received power $P_{NBR}$ of the reference signal from the neighbor base station apparatus (Step S1201).

Next, the terminal apparatus acquires the cell information including the offset value, which is notified from each of the base station apparatuses (Step S1202).

Next, in a case where the serving base station apparatus to which the terminal apparatus connects currently is a base station apparatus that supports both of the linear MU-MIMO and the nonlinear MU-MIMO (Yes in Step S1203), the terminal apparatus substitutes the second offset value that is notified from the serving base station apparatus, as the offset value $\alpha_{SRV}$ that corresponds to the serving base station apparatus (Step S1205).

On the other hand, in a case where the serving base station apparatus is a base station apparatus that supports only the linear MU-MIMO (No in Step S1203), the terminal apparatus substitutes the first offset value that is notified from the serving base station apparatus, as the offset value $\alpha_{SRV}$ that corresponds to the serving base station apparatus (Step S1204).

Next, in a case where the neighbor base station apparatus is a base station apparatus that supports both of the linear MU-MIMO and the nonlinear MU-MIMO (Yes in Step S1206), the terminal apparatus substitutes the second offset value that is notified from the neighbor base station apparatus, as the offset value $\alpha_{NBR}$ that corresponds to the neighbor base station apparatus (Step S1208).

On the other hand, in a case where the neighbor base station apparatus is a base station apparatus that supports only the linear MU-MIMO (No in Step S1206), the terminal apparatus substitutes the first offset value that is notified from the neighbor base station apparatus, as the offset value $\alpha_{NBR}$ that corresponds to the neighbor base station apparatus (Step S1207).

Next, the terminal apparatus compares results of adding the offset values $\alpha_{SRV}$ and $\alpha_{NBR}$ to results of measuring received powers $P_{SRV}$ and $P_{NBR}$ of the reference signals of the base station apparatuses, respectively.

Then, in a case where the result $(P_{NBR}+\alpha_{NBR})$ of the addition for the neighbor base station apparatus is better than the result $(P_{SRV}+\alpha_{SRV})$ of the addition for the serving base station apparatus (Yes in Step S1209), the terminal apparatus notifies the serving base station apparatus of a result of the determination of the received power indicating that a condition for the terminal apparatus to hand over to the neighbor base station apparatus is satisfied (Step S1210).

On the other hand, in a case where the result $(P_{NBR}+\alpha_{NBR})$ of the addition for the neighbor base station apparatus is worse than the result $(P_{SRV}+\alpha_{SRV})$ of the addition for the serving base station apparatus (No in Step S1209), the terminal apparatus terminates the processing.

In this manner, according to the present embodiment, it is possible that according to the MU-MIMO scheme which the base station apparatus supports and the MU-MIMO scheme which the terminal apparatus supports for receiving, the proper offset value is set that results from considering a difference in the transmission efficiency due to a difference between the MU-MIMO schemes.

For example, in a case where either of or both of the base station apparatus and the terminal apparatus support only the linear MU-MIMO, the first offset value is set and thus the cell selection is performed. Then, in a case where both of the base station apparatus and the terminal apparatus support the nonlinear MU-MIMO that can realize the high transmission efficiency, the greater second offset value is set and thus the cell that the base station apparatus makes up over a broader range is selected.

Accordingly, for example, within the macro cell, in a heterogeneous network and the like in which the pico base station apparatus is arranged that locally (such as in a hotspot) provides transmission with higher spectral efficiency than the spectral efficiency between the terminal apparatus and the macro base station apparatus using the MU-MIMO, more efficient transmission is possible.

A program running on the communication apparatus (the base station apparatus and the terminal apparatus) according to the present invention may be a program (program for causing a computer to perform functions) for controlling a central processing unit (CPU) and the like in such a manner that the functions according to the embodiment of the present invention are realized. Then, the information that is handled in these apparatuses is temporarily stored in a Random Access Memory (RAM) while being processed. Thereafter, the information is stored in various types of ROM such as a flash Read Only Memory (ROM) or a Hard Disk Drive (HDD) and, whenever necessary, is read by the CPU to be modified or written. Furthermore, a program for realizing functions in each of the configurations in FIG. 6 and the like is recorded on a computer-readable medium, the program recorded in the computer-readable medium is read by a computer system, and then, the CPU and the like may execute the program so that processing by each unit is performed. Moreover, the "computer system" here is defined as including an OS and hardware components such as a peripheral device.

Furthermore, the "computer-readable recording medium" refers to a portable medium such as a flexible disk, a magneto-optical disk, a ROM, and a CD-ROM, and a storage device such as a hard disk that is built into the computer system. Moreover, the "computer-readable recording medium" is defined as including whatever dynamically retains the program for a short period of time, such as a communication line that is used when transmitting the program over a network such as the Internet or over a communication circuit such as a telephone circuit and as including whatever retains the program for a constant period of time, such as a volatile memory within the computer system, which functions as a server or a client in the case of retaining the program dynamically. Furthermore, the program may be one for realizing some of the functions described above and additionally may be one that can realize the functions described above in combination with a program that is already recorded in the computer system. Furthermore, some or all of the portions of the communication apparatus according to the embodiment, which is described above, may be realized as an LSI that is a typical integrated circuit. Each functional block of the communication apparatus may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semi-conductor technology, a technology of an integrated circuit that substitutes for the LSI appears, it is also possible to use the integrated circuit to which the technology applies.

The embodiments of the invention are described above in detail referring to the drawings, but the specific configuration is not limited to the embodiments and includes inventions that result from making design amendments and so forth within a scope that does not depart from the gist of the invention. The present invention is applicable to the communication apparatus for use.

Furthermore, according to the embodiments described above, control lines or information lines indicate what are considered to be necessary for description, and all the control lines or information lines are not necessarily drawn in terms of a product. All the configurations may be connected to one another.

REFERENCE SIGNS LIST

100 MACRO BASE STATION APPARATUS
210, 220 PICO BASE STATION APPARATUS
300 TERMINAL APPARATUS
501 NETWORK COMMUNICATION UNIT
502 WIRELESS ACCESS CONTROL UNIT
503 WIRELESS ACCESS UNIT
504 WIRELESS SIGNAL PROCESSING UNIT
505 WIRELESS UNIT
506 ANTENNA UNIT
601 OFFSET VALUE SETTING UNIT
602 OFFSET VALUE NOTIFICATION INFORMATION GENERATION UNIT
603 RESULT-OF-DETERMINATION NOTIFICATION INFORMATION ACQUISITION UNIT
604 HANDOVER CONTROL UNIT
605 HANDOVER COMMAND GENERATION UNIT
801 ANTENNA UNIT

802 WIRELESS ACCESS UNIT
803 WIRELESS UNIT
804 WIRELESS SIGNAL PROCESSING UNIT
805 WIRELESS ACCESS CONTROL UNIT
901 OFFSET VALUE ACQUISITION UNIT
902 OFFSET VALUE STORAGE UNIT
903 RECEIVED POWER ACQUISITION UNIT
904 RECEIVED POWER DETERMINATION UNIT
905 RESULT-OF-DETERMINATION NOTIFICATION INFORMATION GENERATION UNIT

The invention claimed is:

1. A terminal apparatus that supports a plurality of precoding schemes, the terminal apparatus comprising:
wireless access circuitry that receives a first plurality of offset values that each respectively correspond to each of the plurality of precoding schemes from a first base station apparatus, and that measures a received power of a first reference signal transmitted from the first base station apparatus; and
wireless access control circuitry that adds, to the received power of the first reference signal from the first base station apparatus, an offset value that corresponds to a precoding scheme which both of the first base station apparatus and the terminal apparatus support, among the first plurality of offset values.

2. The terminal apparatus according to claim 1,
wherein the plurality of precoding schemes include a linear precoding scheme, and
wherein the first plurality of offset values include a first offset value that corresponds to a linear Multi-User Multiple Input Multiple Output (MU-MIMO) which uses the linear precoding scheme.

3. The terminal apparatus according to claim 2,
wherein in a case where only the linear precoding scheme is supported, the wireless access control circuitry adds the first offset value to the received power of the first reference signal.

4. The terminal apparatus according to claim 2,
wherein in a case where both of the linear precoding scheme and the nonlinear precoding scheme are supported, the wireless access control circuitry adds the second offset value to the received power of the first reference signal.

5. The terminal apparatus according to claim 2, wherein the plurality of precoding schemes further include a nonlinear precoding scheme, and
the first plurality of offset values further include a second offset value that corresponds to a nonlinear MU-MIMO which uses the nonlinear precoding scheme.

6. The terminal apparatus according to claim 2,
wherein the second offset value is greater than the first offset value.

7. The terminal apparatus according to claim 6,
wherein the wireless access circuitry receives the first offset value and a value of a difference between the first offset value and the second offset value, and
wherein the wireless access control circuitry adds the value of the difference to the first offset value and thus calculates the second offset value.

8. The terminal apparatus according to claim 2,
wherein the second offset value is a value that results from adding to the first offset value a value of a difference between a received gain in a case where the nonlinear MU-MIMO is used and a received gain in a case where the linear MU-MIMO is used.

9. The terminal apparatus according to claim 1, wherein the wireless access control circuitry determines a cell selection based on the received power of the first reference signal to which the offset value is added.

10. The terminal apparatus according to claim 1, wherein the wireless access control circuitry determines whether to execute a handover based on the received power of the first reference signal to which the offset value is added.

11. The terminal apparatus according to claim 10, wherein the wireless access circuitry receives, from a second base station apparatus, a second plurality of offset values that correspond to each of the plurality of precoding schemes, and measures a received power of a second reference signal transmitted from the second base station apparatus,
the wireless access control circuitry adds an offset value corresponding to a precoding scheme that both of the second base station apparatus and the terminal apparatus support, among the second plurality of offset values, to the received power of the second reference signal, and compares the sums thereof; and
the terminal apparatus further includes wireless access circuitry that transmits a notification information that gives a notification that handover to the second base station apparatus is possible, to the first base station apparatus, in a case where the received power of the second reference signal to which the offset value is added is greater than the received power of the first reference signal, to which the offset value is added.

12. A wireless communication system comprising:
a base station apparatus that supports a plurality of precoding schemes; and
at least one terminal apparatuses that communicates with the base station apparatus, wherein
the base station apparatus includes first wireless access circuitry that transmits a plurality of offset values that respectively correspond to each of the plurality of precoding schemes to the at least one terminal apparatus, and
the at least one terminal apparatus includes second wireless access circuitry that receives the plurality of offset values from the base station apparatus and measures a received power of a reference signal transmitted from the base station apparatus, and
wireless access control circuitry that adds, to the received power of the reference signal, an offset value that corresponds to a precoding scheme that both of the base station apparatus and the at least one terminal apparatus support, among the plurality of multiple offset values.

13. The wireless communication system according to claim 12, wherein
the plurality of precoding schemes include a linear precoding scheme and a nonlinear precoding scheme, and
the plurality of offset values include:
a first offset value that corresponds to a linear Multi-User Multiple Input Multiple Output (MU-MIMO) which uses the linear precoding scheme, and
a second offset value that corresponds to a nonlinear MU-MIMO which uses the nonlinear precoding scheme.

* * * * *